(12) United States Patent
Jakobsson

(10) Patent No.: US 9,516,004 B2
(45) Date of Patent: Dec. 6, 2016

(54) DETECTING HORIZONTAL ATTACKS

(71) Applicant: PAYPAL, INC., San Jose, CA (US)

(72) Inventor: Bjorn Markus Jakobsson, Portola Valley, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 13/928,215

(22) Filed: Jun. 26, 2013

(65) Prior Publication Data

US 2014/0325617 A1    Oct. 30, 2014

Related U.S. Application Data

(60) Provisional application No. 61/815,385, filed on Apr. 24, 2013.

(51) Int. Cl.
*G06F 21/46* (2013.01)
*H04L 29/06* (2006.01)
*G06F 21/31* (2013.01)

(52) U.S. Cl.
CPC ..................... *H04L 63/08* (2013.01)

(58) Field of Classification Search
CPC ........ G06F 21/31; G06F 21/41; H04L 9/3263; H04L 9/0844; H04L 9/3226; H04L 63/0823
See application file for complete search history.

(56) References Cited

U.S. PATENT DOCUMENTS

| 8,490,162 | B1* | 7/2013 | Popoveniuc et al. | 726/5 |
| 2006/0294392 | A1* | 12/2006 | Veprek et al. | 713/183 |
| 2007/0022196 | A1* | 1/2007 | Agrawal | 709/225 |
| 2007/0079136 | A1* | 4/2007 | Vishik et al. | 713/186 |
| 2008/0120717 | A1* | 5/2008 | Shakkarwar | 726/18 |
| 2009/0077618 | A1* | 3/2009 | Pearce et al. | 726/1 |
| 2013/0347129 | A1* | 12/2013 | Samuelsson et al. | 726/28 |

OTHER PUBLICATIONS

Single Sign-On Architectures. Jan De Clercq. LNCS(2002).*
FAME: Adding Multi-Level Authentication to Shibboleth. Nenadic et al. IEEE(2006).*
A Method of Risk Assessment for Multi-Factor Authentication. Kim et al. Journal of Information Processing Systems(Mar. 2011).*
Born to be breached:the worst passwords are still the most common. Gallagher, Sean. Arstechnica(2012).*
How to Prevent Passwords Encryption Exploits. Weiss, Aaron. eSecurityPlanet(2012).*

(Continued)

*Primary Examiner* — Venkat Perungavoor
(74) *Attorney, Agent, or Firm* — Haynes and Boone, LLP

(57) ABSTRACT

Horizontal attacks may be detected in an authentication system by comparing entered credentials to a list of common credentials, increasing a score if the entered credential matches a credential on the list of common credentials, and then making a security determination based on the score. The score increase may be weighted based on factors including a recentness of a previous authentication, a similarity of the credential to a correct or common credential, a commonality of the entered credential, and whether or not additional security precautions are being taken. The score may be associated with a credential, an authentication attempt, or may be a system-wide score that, when it reaches a threshold may be indicative of a system-wide attack.

27 Claims, 3 Drawing Sheets

(56) References Cited

OTHER PUBLICATIONS

Hackers using Brute-Force Attacks to Harvet WordPress Sites. Mimoso, Mike.Threatpost(Apr. 2013).*
Password Cracking Using Probabilistic Context-Free Grammars. Weir et al. IEEE(2009).*
Guess again (and again and again): Measuring passord strength by simulating passowrd-cracking algortihms. Kelley et al. IEEE(2012).*
The science of guessing: analyzing an anonymized corpus of 70 million passowrds. Bonneau, Joseph. IEEE(2012).*
Implicit Authentication for Mobile Devices. Jakobsson et al. IEEE(2009).*

* cited by examiner

DETECTING HORIZONTAL ATTACKS

CROSS REFERENCE TO RELATED APPLICATIONS

Pursuant to 35 U.S.C. §119(e), this application claims priority to U.S. Provisional Patent Application No. 61/815,385, filed on Apr. 24, 2013, the disclosure of which is hereby incorporated by reference herein in its entirety.

BACKGROUND

Technical Field

Embodiments disclosed herein are related to systems and methods for detecting horizontal attacks.

Related Art

As people use the internet for more and more reasons, scammers and so-called "black-hat" hackers increasingly look to the internet as a new frontier of illicit opportunity. People who use the internet to conduct financial transactions, such as making purchases and banking, can be attacked by the scammers and hackers and can be tricked into unwittingly divulging important personal information, such as login information, passwords, bank account information, and credit card numbers. The attackers can use this information for their financial gain, which can hurt the financial standing and credit rating of the people whose information is stolen.

One example of a known method used by attackers is called a horizontal attack. The horizontal attack is a type of attack in which an attacker attempts to use common passwords or other credentials to authenticate to a remote server. The attacker may try the same set of common credentials, such as a PIN of 1234 or 2580, for a number of different users, or may try a set of common credentials against a single user, such as a password of 12345678. The theory is that if the attacker tries enough common credentials against enough users, there is a good likelihood that the attacker will successful at least some of the time. The attacker can thus intercept or even change data, such as personal data and financial data by impersonating the one or more parties to each other, compromising the security of internet communications and transactions.

The variety and portability of internet-capable device have resulted in not only users being capable of performing internet communications and transactions more frequently, but also in the opportunity for attackers to trick users into giving them personal info nation and financial data. The lucrative potential that these attacks present the attackers encourages attackers to try and stay one or more steps ahead of the security. When a countermeasure or other security provision is put into place to stop or otherwise limit the effect of an attack, the attackers develop ways to overcome the countermeasure, or find additional ways to exploit the operating system, browser or other executable software to launch another, possibly more effective attack.

Figure 1:
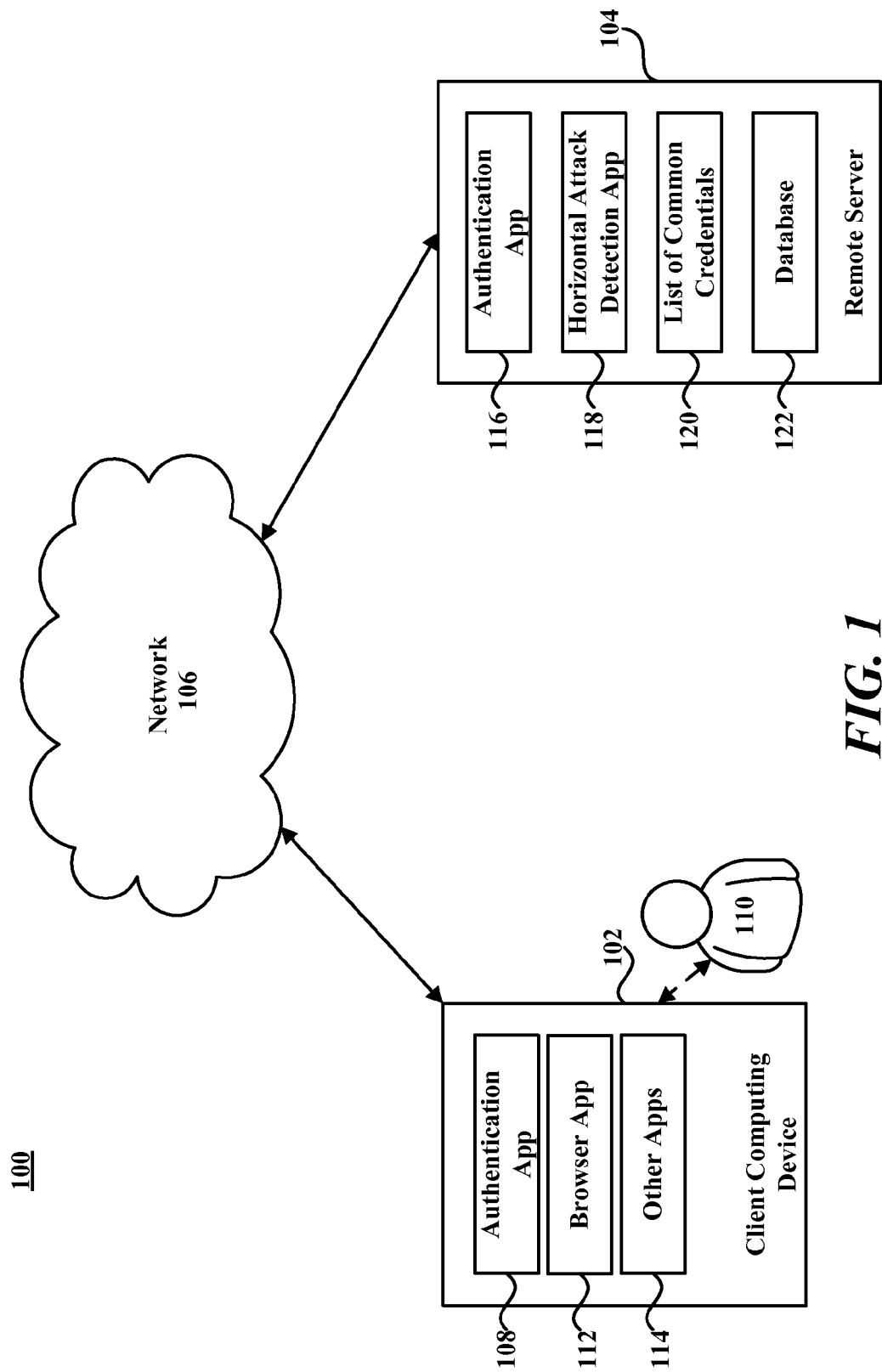
FIG. 1 is a block diagram of a networked system, consistent with some embodiments.

In the drawings, elements having the same designation have the same or similar functions.

DETAILED DESCRIPTION

In the following description, specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Consistent with some embodiments, there is provided a method. The method includes steps of receiving a credential input by a user during an authentication process and determining if the received credential is correct. When the received credential is not correct, the method includes further steps of comparing the received credential to a list of common credentials. Moreover, when the received credential matches a common credential on the list of common credentials, the method also includes steps of increasing a score associated with the common credential and making a security determination based on the score. Consistent with some embodiments, there is also provided a system capable of performing the method.

These and other embodiments will be described in further detail below with respect to the following figures.

FIG. 1 is a block diagram of a networked system 100, consistent with some embodiments. System 100 includes a client computing device 102 and a remote server 104 in communication over a network 106. Remote server 104 may be a payment service provider server that may be maintained by a payment provider, such as PayPal, Inc. of San Jose, Calif. Remote server 104 may be maintained by other service providers in different embodiments. Remote server 104 may also be maintained by an entity with which sensitive credentials and information may be exchanged with client computing device 102. Remote server 104 may be more generally a web site, an online content manager, a service provider, such as a bank, or other entity who provides content to a user requiring user authentication or login.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices. Consistent with some embodiments, client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. For example, such instructions may include authentication app 108 for authenticating client computing device 102 to remote server 104. Consistent with some embodiments, authentication app 108 may be a mobile authentication app, which may be used to authenticate user 110 to remote server 104 over network 106. Authentication app 108 may include instructions executable by one or more processors that is configured to display a Graphical User Interface (GUI) for user 110 to enter credentials for authenticating with remote server 104 or other servers managed by content providers or merchants via network 106.

Client computing device 102 may include a browser app 112. Browser app 112 may be a mobile browser app, which may be used to provide a user interface to permit a user 110 to browse information available over network 106. For example, browser application 114 may be implemented as a web browser to view information available over network 106. Browser application 114 may include instructions executable by one or more processors for interfacing and communicating with remote server 104 or other servers managed by content providers or merchants via network 106. For example, user 110 may be able to access websites to find and purchase items, as well as access user account information or web content. Client computing device 102 may also include other applications 114 as may be desired in one or more embodiments to provide additional features available to user 110, including accessing a user account with remote server 104. For example, applications 114 may include interfaces and communication protocols that allow the user to receive and transmit information through network 106 and to remote server 104 and other online sites. Applications 114 may also include security applications for implementing client-side security features, programmatic client applications for interfacing with appropriate application programming interfaces (APIs) over network 106 or various other types of generally known programs and/or applications. Applications 114 may include mobile apps downloaded and resident on client computing device 102 that enables user 110 to access content through the apps.

Remote server 104, according to some embodiments, may be maintained by an online payment provider, which may provide processing for online financial and information transactions on behalf of user 110. Remote server 104 may include at least authentication application 116, which may be adapted to interact with authentication app 108 of client computing device 102 over network 106 to authenticate client computing device 102 to remote server 104. According to some embodiments, authentication app 116 sends information over network 106 to client computing device 102 for use by authentication app 108 for authenticating user 116 to remote server 104. Such information may include an authentication attempt threshold corresponding to a maximum number of authentication attempts that user 110 is permitted before a security action is performed. Consistent with some embodiments, authentication app 116 may determine an authentication attempt threshold based, in part, on an authentication attempt history of user 110.

Remote server 104 may also include an application for detecting horizontal attacks 118. Horizontal attack detecting app 118 may include instructions for detecting a horizontal attack being made on remote server 104, which may include attacks on individual accounts stored on remote server 104 and/or multiple accounts or server-wide attacks. The instructions may include instructions for determining, when user 110 attempts to authenticate to remote server 104 using authentication app 110, whether user 110 has supplied a correct credential. Credential, as used herein, may refer to any identifier that may be used to authenticate user 110, such as a user name, a password, a personal identification number (PIN), a biometric identifier, etc. If the received credential is not correct, horizontal attack detection app 118 may compare the received credential to a list of common credentials 120. If the received credential matches a common credential on list 120, horizontal attack detection app 118 may increase a score associated with the common credential, and then make a security determination based on the score. In some embodiments, list 120 may be generated based on a survey of credentials stored in database 122, or it may be received from a third party. In some embodiments, horizontal detection app 118 may instead be a module. Module, as used herein, may refer to a software module that performs a function when executed by a processor. In other embodiments, a module may refer to an Application Specific Integrated Circuit (ASIC) or other circuit having memory at least one processor for executing instructions to perform a function.

Database 122 may store information for authentication application 116 and/or horizontal attack detection app 118 to use during authentication. Database 122 may also store information about user 110, such as account information, personal information, and an authentication attempt history of user 110.

Figure 2:
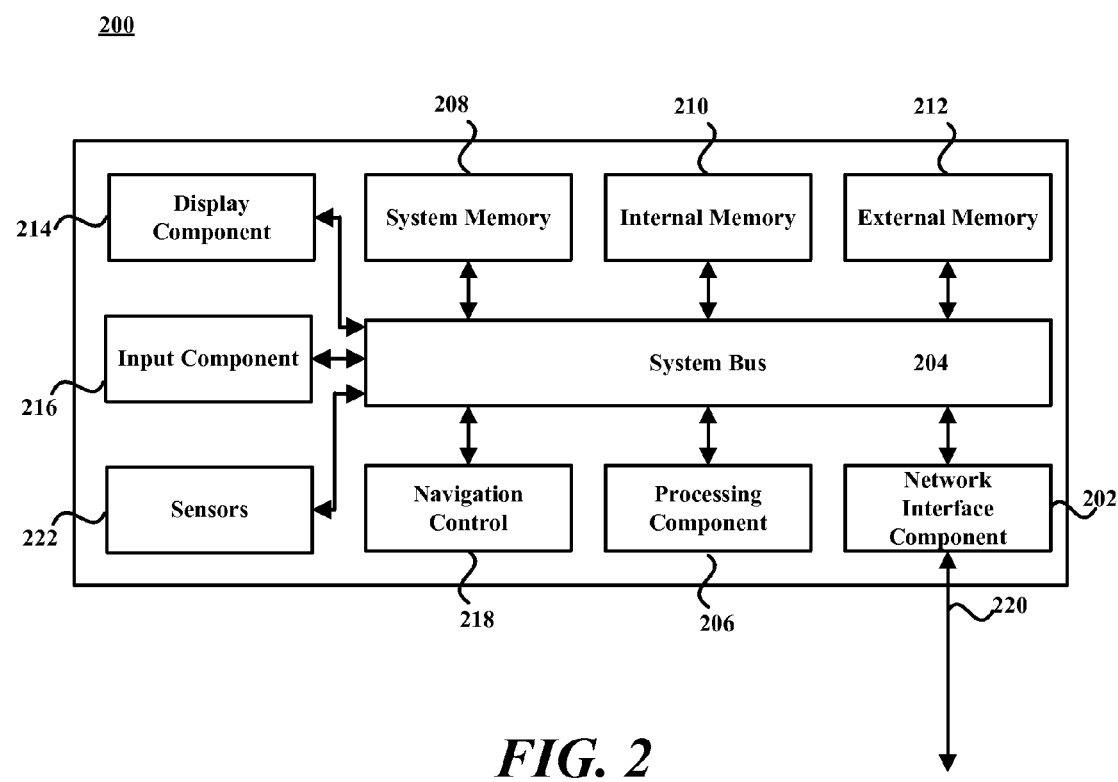
FIG. 2 is a diagram illustrating computing system, consistent with some embodiments.

FIG. 2 is a diagram illustrating computing system 200, which may correspond to either of client computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 104. As shown in FIG. 2, computing system 200 includes a network interface component (NIC) 202 configured for communication with a network such as network 106 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 106. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Consistent with some embodiments, computing system 200 includes a system bus 204 for interconnecting various components within computing system 200 and communication information between the various components. Such components include a processing component 206, which may be one or more processors, micro-controllers, or digital signal processors (DSP), graphics processing unit (GPU), a system memory component 208, which may correspond to random access memory (RAM), an internal memory component 210, which may correspond to read-only memory (ROM), and an external or static memory 212, which may correspond to optical, magnetic, or solid-state memories. Consistent with some embodiments, computing system 200 further includes a display component 214 for displaying information to a user 110 of computing system 200. Display component 214 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a user 110 of computing system 200 to input information to computing system 200. Such information could include payment information such as an amount required to complete a transaction, account information, authentication information, identification information, or a credential. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if device 200 includes a touch screen, display component 214, input component 216, and navigation control 218 may be a single integrated component, such as a capacitive sensor-based touch screen.

Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure. Logic may be encoded in a computer readable medium, which may refer to any medium that participates in providing instructions to processing component 206 for execution. Such a medium may take many forms, including but not limited to, non-volatile media, volatile media, and transmission media. The medium may correspond to any of system memory 208, internal memory 210 and/or external or static memory 212. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 220 to network 106 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 220 and network interface component 202. Communication link 220 may be wireless through a wireless data protocol such as Wi-Fi™, 3G, 4G, HSDPA, LTE, RF, NFC, or through a wired connection. Network interface component 202 may include an antenna, either separate or integrated, to enable transmission and reception via communication link 220. Received program code may be executed by processing component 206 as received and/or stored in memory 208, 210, or 212.

Computing system 200 may also include sensor components 222. Sensor components 222 may include any sensory device that captures information related to the surroundings of client computing device 102. Sensor components 222 may include camera and imaging components, accelerometers, global positioning system (GPS) devices, motion capture devices, and other devices that are capable of providing information about client computing device 102, user 110, or their surroundings. Sensor components 222 may also include sensors that may be used in an authentication process, such as biometric sensors.

In some embodiments, remote server 104 may be capable of receiving an authentication request and detecting horizontal attacks based in part on the authentication process. Remote server 104 may receive and process the authentication request using authentication app, and may detect horizontal attacks using horizontal attack detection app 118. In operation, remote server 104 may receive a credential input by user 110 during an authentication process. User 110 may input the credential on client device 102 in response to a prompt generated by authentication app 108. Authentication app 108 may then transmit the input credential to remote server 104, where network interface component 202 receives the credential. The credential may be stored in plaintext, or it may be encrypted. Authentication app 116 may then determine if the received credential is correct.

When the received credential is determined to not be correct, horizontal detection application 118 may compare the received credential to a list of common credentials 120. When the received credential matches a common credential on list of common credentials 120, horizontal detection application 118 may increase a score associated with the common credential, and make a security determination based on the score. For example, a correct credential associated with user 110 is "2g329d", but the remote server receives "dog." If "dog" is on list 120, a score associated with the credential may be increased, as there may be a good likelihood that an attacker is entering common credentials in a horizontal attack in order to gain access to an account.

In some embodiments, horizontal attack detection application 118 may generate list of common credentials 120 based on user data, such as user data stored in database 122. However, in some embodiments, remote server 104 may obtain list of common credentials 120 from a third party such as a security firm or clearinghouse.

In some embodiments, authentication app 116 may match a previous credential associated with user 110 if the received credential is determined to be incorrect. If the incorrect credential matches a correct previous credential associated with user 110, horizontal attack detection application 118 may not increase the score associated with the credential, or, instead, may weight the score less than it may weight the score otherwise, as will be discussed in more detail later.

In some embodiments, increasing a score associated with the common credential may be increased, a score associated with a user authentication attempt may be increased, or a global score associated with remote server 104 may be increased. In some embodiments, when increasing the score associated with the common credential, horizontal attack detection app 118 may give a larger weight to the score increase based on the commonality of the credential. For example, if the received credential matches the most common credential on list 120, horizontal attack detection app 118 may weight the score increase as 1 or greater than 1. Whereas, if the received credential matches a credential on list 120, but is among the less common credentials on list 120, horizontal attack detection app 118 may weight the score increase less than 1.

In some embodiments, authentication app 116 may be capable of determining a similarity value associated with the received credential when determining if the received credential is correct. The similarity value may refer to how similar the received credential is to at least one of a common credential and a previous credential associated with the user. For example, if the correct credential is supposed to be "cat", and user 110 enters "kat", these are similar and would be given an appropriate similarity value based on the similarity. The similarity value may also be a type of weighting that is used by horizontal attack detection app 118 when increasing a score. If "cat" is on list 120, the similarity of "kat" to "cat" is significant enough that even though it is not an exact match, horizontal attack detection app 118 may still provide a weighted score increase based on the similarity. However, the weighted increase may be less than it would be for an exact match.

In some embodiments, horizontal attack detection app 118 may also increase a global score associated with remote server 104. This global score may be associated with an attack being made on remote server 104, as a whole, and when the global score reaches a threshold, horizontal attack detection app 118 may determine that remote server 104 is under a horizontal attack and make take an action, such as shut down the system, or provide an increased weighted increase to all score increases.

Weighted score increases have been discussed. In some embodiments a weighted factor associated with the score increase may be based on a recentness of a successful authentication attempt by user 110, such that the weighted factor may be zero if the recentness of a successful authentication attempt by the user is more than a threshold. Moreover, as discussed previously, the weighted factor may be greater if a determination is made that remote server 104 is under attack. In some embodiments, horizontal attack detection app 118 may store a time of each score increase, wherein a lower weight factor may be used if the time of the score increase is greater than a threshold time. This way, if user 110 has not successfully authenticated recently, user 110 may be more likely to make a mistake when entering a credential and, as such, the score increase associated with the incorrect entry may be given a lower weight than if user 110 routinely and/or recently successfully authenticates and would be less likely to forgot their credential. Additional detail of tempering user authentication based on a recentness of successful authentication may be found in U.S. patent application Ser. No. 13/800,733, filed on Mar. 13, 2013, the disclosure of which is hereby incorporated by reference in its entirety.

Figure 3:
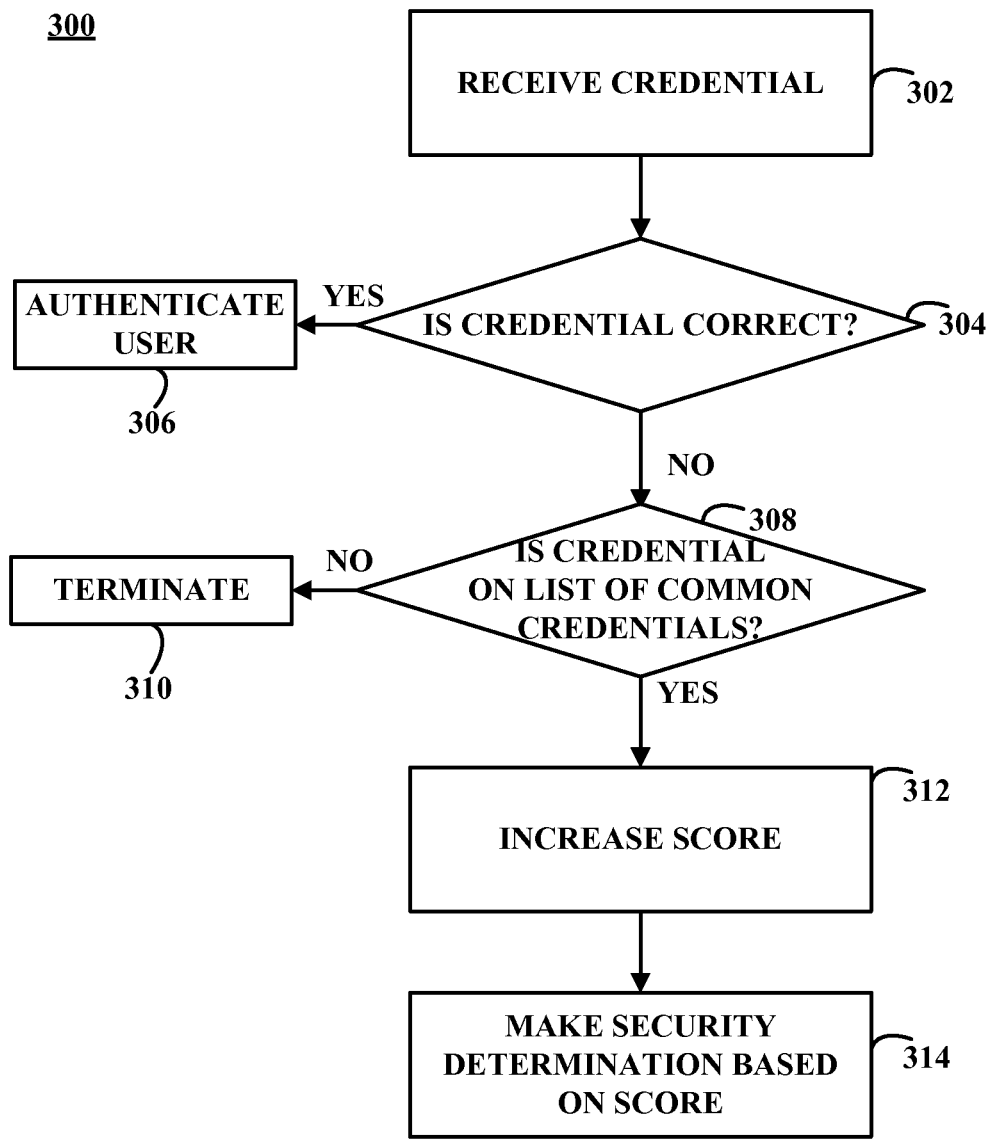
FIG. 3 is a flowchart illustrating a method for determining a number of authentication attempts a user will be provided during a session until a security action is performed, consistent with some embodiments.

FIG. 3 is a flowchart illustrating a method for detecting horizontal attacks, consistent with some embodiments. For the purpose of illustration, FIG. 3 will be described with reference to any of FIGS. 1 and 2. The method shown in FIG. 3 may be embodied in computer-readable instructions for execution by one or more processors in processing component 206 such that the steps of the method may be performed by remote server 104. As shown in FIG. 3, method 300 begins by receiving a credential (302). In some embodiments, the credential may be received from client device 102 and may have been entered by user 110 in response to a prompt from authentication application 108 or browser application 114 for authenticating with remote server 104. The received credential may be received in plain or clear text, or it may be received as being encrypted. Processing component 206 of remote server 104, executing instructions to run authentication app 116 may determine if the received credential is a correct credential associated with user 110 (304). In some embodiments, correct credential information may be stored in database 122. If the credential is correct, user 110 may be authenticated (306).

However, if the credential is not correct, processing component 206 of remote server 104, executing instructions to run horizontal attack detection app 118, may determine if the received credential matches a common credential on list of common credentials 120 (308). In some embodiments, list of common credentials 120 may be generated by remote server 104 using account information stored in database 122. In other embodiments, list of common credentials 120 may be generated by a third party and sent to remote server 104. If the received credential does not match a credential on list of common credentials 120, method 300 may terminate (310) and user 110 may be asked to attempt authenticating again.

If the received credential matches a credential on list of common credentials 120, a score may be increased (312). In some embodiments, the score may be a weighted score, wherein the weighting is determined by such factors as a recentness of a successful authentication, a recentness of a failed authentication, a similarity of the received credential to a correct credential or a credential on list 120, and whether any other security measures are currently being enacted on remote server 104. Moreover, the score may be a score associated with the common credential, a score associated with the particular authentication attempt, or a score associated with remote server 104 and all authentication processes handled by remote server 104. Based on the score increase, processing component 206 executing instructions to run horizontal attack detection app 118 may make a security determination (314). The security determination may be to increase the weight of all score increases for all authentication attempts. The security determination may also include an account freeze or lockout.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide a system and method for detecting horizontal attacks that does not unfairly punish users who may make mistakes when attempting to authenticate, but still provides flexibility for allowing significant security measures to be taken when an attack is actually occurring. Consequently, embodiments provided herein may provide additional security to users who frequently authenticate, while giving a few more attempts to user who do not frequently authenticate without significantly decreasing security. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system, comprising:
a non-transitory memory storing a list of common credentials;
a network interface component, configured to receive a credential associated with a user authentication attempt; and
one or more hardware processors configured to execute instructions to cause the system to perform operations comprising:
determining if the received credential is correct;
comparing the received credential to the list of common credentials when the received credential is not correct; and
when the received credential matches a common credential on the list of common credentials:
increasing a score by a weighted factor based on the received credential matching the common credential, wherein increasing the score indicates an increased likelihood that an attacker is entering common credentials in a horizontal attack in order to gain access to a user account;
storing a time associated with the score increase; and
making a security determination based on the score;
wherein the weighted factor is lower when a time since a previous score increase is greater than a threshold time than when the time since the previous score increase is less than or equal to the threshold time.

2. The system of claim 1, wherein the network interface component is further configured to receive the list of common credentials.

3. The system of claim 1, wherein the operations further comprise generating the list of common credentials based on credentials associated with users of the system.

4. The system of claim 1, wherein the operations further comprise increasing a score associated with a user authentication attempt.

5. The system of claim 1, wherein the weighted factor is associated with a commonality of the common credential.

6. The system of claim 5, wherein the weighted factor is larger for more common credentials on the list and smaller for less common credentials on the list.

7. The system of claim 1, wherein the weighted factor is based on a recentness of a successful authentication attempt by the user.

8. The system of claim 7, wherein the weighted factor is zero if the recentness of a successful authentication attempt by the user is more than a threshold.

9. The system of claim 1, wherein the weighted factor is greater if a determination is made that an authentication system for performing the authentication system is under attack.

10. The system of claim 1, wherein the score comprises a score associated with a user authentication attempt.

11. A method comprising:
receiving, by a server, a credential from a user during an authentication process;
determining, by the server, the received credential is not correct;
comparing, by the server, the received credential to a list of common credentials; and
when the received credential matches a common credential on the list of common credentials:
increasing, by the server, a score by a weighted factor based on the received credential matching the common credential, wherein increasing the score indicates an increased likelihood that an attacker is attempting to gain unauthorized access to a user account;
storing a time associated with the score increase; and
making a security determination, by the server, based on the score.
wherein the weighted factor is lower when a time since a previous score increase is greater than a threshold time than when the time since the previous score increase is less than or equal to the threshold time.

12. The method of claim 11, wherein comparing the received credential to a list of common credentials comprises:
generating, by the server, the list of common credentials based on user data; and
comparing, by the server, the received credential to the generated list of common credentials.

13. The method of claim 11, wherein comparing the received credential to a list of common credentials comprises:
obtaining, by the server, the list of common credentials from a third party; and
comparing, by the server, the received credential to the obtained list of common credentials.

14. The method of claim 11, wherein determining the received credential is not correct comprises determining the received credential does not match a previous credential associated with the user.

15. The method of claim 14, wherein the previous credential associated with the user comprises a correct credential of the user.

16. The method of claim 14, wherein the previous credential comprises a credential entered by the user during an authentication process.

17. The method of claim 11, wherein increasing a score comprises increasing a score associated with a user authentication attempt.

18. The method of claim 11, wherein the weighted factor is associated with the commonality of the common credential.

19. The method of claim 18, wherein the weighted factor is larger for more common credentials on the list and smaller for less common credentials on the list.

20. The method of claim 11, wherein determining the received credential is not correct comprises determining a similarity value associated with the received credential.

21. The method of claim 20, wherein the similarity value corresponds to how similar the received credential is to at least one of a common credential and a previous credential associated with the user.

22. The method of claim 11, wherein increasing a score comprises increasing a global score associated with an authentication system associated with the server, the authentication system performing the authentication process.

23. The method of claim 22, further comprising:
comparing, by the server, the global score associated with the authentication system to a threshold; and
determining, by the server, that the authentication system is under attack when the global score associated with the authentication system reaches the threshold.

24. The method of claim 11, wherein the weighted factor is based on a recentness of a successful authentication attempt by the user.

25. The method of claim 24, wherein the weighted factor is zero if the recentness of a successful authentication attempt by the user is more than a threshold.

26. The method of claim 11, wherein the weighted factor is greater if a determination is made that an authentication system for performing the authentication system is under attack.

27. The method of claim 11, wherein the score comprises a score associated with a user authentication attempt.

* * * * *